United States Patent
Cheng et al.

(10) Patent No.: US 9,014,264 B1
(45) Date of Patent: Apr. 21, 2015

(54) DYNAMIC MEDIA TRANSMISSION RATE CONTROL USING CONGESTION WINDOW SIZE

(71) Applicant: Google Inc., Mountain View, CA (US)

(72) Inventors: Yuchung Cheng, Sunnyvale, CA (US); Monia Ghobadi, Mountain View, CA (US)

(73) Assignee: Google Inc., Mountain View, CA (US)

( * ) Notice: Subject to any disclaimer, the term of this patent is extended or adjusted under 35 U.S.C. 154(b) by 138 days.

(21) Appl. No.: 13/655,187

(22) Filed: Oct. 18, 2012

Related U.S. Application Data

(60) Provisional application No. 61/558,116, filed on Nov. 10, 2011.

(51) Int. Cl.
*H04B 1/66* (2006.01)
*H04N 7/12* (2006.01)
*H04N 11/02* (2006.01)
*H04N 11/04* (2006.01)
*H04L 12/26* (2006.01)

(52) U.S. Cl.
CPC .................................. *H04L 12/2647* (2013.01)

(58) Field of Classification Search
CPC ............ H04L 12/2647; H04L 12/2649; H04L 12/2652; H04L 43/0829; H04L 43/0835; H04L 43/0841; H04L 47/10; H04L 65/4092; H04L 12/596; H04L 69/16; H04L 47/27; H04L 47/27375

USPC .................................................. 375/240–241
See application file for complete search history.

(56) References Cited

U.S. PATENT DOCUMENTS

| | | | |
|---|---|---|---|
| 2002/0062313 A1* | 5/2002 | Lee et al. ........................... | 707/3 |
| 2002/0156910 A1* | 10/2002 | Senda ............................ | 709/232 |
| 2007/0121511 A1* | 5/2007 | Morandin ..................... | 370/235 |
| 2007/0165524 A1* | 7/2007 | Mascolo ....................... | 370/230 |
| 2007/0230352 A1* | 10/2007 | Kokku et al. ................. | 370/238 |
| 2008/0002575 A1* | 1/2008 | Kumar et al. ................. | 370/229 |
| 2008/0025216 A1* | 1/2008 | Singh et al. ................... | 370/231 |
| 2009/0185620 A1* | 7/2009 | Matsumura ............. | 375/240.02 |
| 2010/0070824 A1* | 3/2010 | Ramakrishnan .............. | 714/752 |
| 2011/0013512 A1* | 1/2011 | Morandin ..................... | 370/231 |
| 2011/0205889 A1* | 8/2011 | Chen et al. .................... | 370/230 |
| 2011/0261691 A1* | 10/2011 | Jin et al. ........................ | 370/230 |

* cited by examiner

*Primary Examiner* — Benjamin H Elliot, IV
(74) *Attorney, Agent, or Firm* — Amin, Turocy & Watson, LLP

(57) ABSTRACT

This disclosure relates to video segment identification and organization based on dynamic characterizations. A media component streams media content to a user device at a rate based at least in part on a congestion window size, and a trickle component determines the congestion window size based at least in part on a set of limiting criteria. The set of limiting criteria can include but is not limited to a queuing delay, a target transmission rate, and/or a packet loss compensation factor.

14 Claims, 12 Drawing Sheets

DYNAMIC MEDIA TRANSMISSION RATE CONTROL USING CONGESTION WINDOW SIZE

CROSS-REFERENCE TO RELATED APPLICATIONS

This application claims the benefit of U.S. Provisional Application No. 61/558,116, filed Nov. 10, 2011 and entitled BOUNDING CONGESTION WINDOW TO RATE LIMIT LARGE CONTENT TRANSFER, the entirety of which is incorporated herein by reference.

TECHNICAL FIELD

This disclosure generally relates to systems and methods that facilitate dynamic control of transmission rates for internet media using congestion window size.

BACKGROUND

The internet and media enabled portable computing devices have dramatically altered the processes for generating and consuming media content. Presently, users can consume media content virtually anywhere at any time, as long as they have access to a media capable device with an internet connection. The convenience of being able to view media content via the internet, essentially on demand, has resulted in explosive growth of internet media consumption.

Streaming is a common method of media delivery across the internet. Streaming media is continuously received and presented to an end-user while being delivered by a streaming provider. Streaming enables media that includes large amounts of data to be displayed on a client device prior to the entire media file being transmitted. Internet media traffic is currently approaching a majority of consumer internet traffic (e.g., traffic delivered via a transmission control protocol (TCP)), and the rate of demand is projected to continue increasing. In particular, streaming media is expected to account for a large portion of the projected increase in demand.

Streaming media content is a computationally expensive process that involves substantial bandwidth and quantities of resources from the streaming provider and client. Typically, streaming providers send media content to clients at a best-effort rate or as quickly as possible. Providing media content as quickly as possible can result in burstiness and trigger unnecessary packet loss.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

According to an aspect of the subject innovation, systems and methods for dynamic media transmission rate control using congestion window size are disclosed. A media component streams media content to a user device at a rate based at least in part on a congestion window size, and a trickle component determines the congestion window size based at least in part on a set of limiting criteria. The set of limiting criteria can include but is not limited to a queuing delay (or round-trip time), a target transmission rate, and/or a packet loss compensation factor.

In an embodiment, a monitoring component monitors a queuing delay for transmissions of packets from a media server to a user device, a target rate component determines a target transmission rate for the transmissions of the packets based at least in part on a set of targeting criteria, and a limiting component determines a transmission control protocol maximum congestion window size based at least in part on the queuing delay and the target transmission rate.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
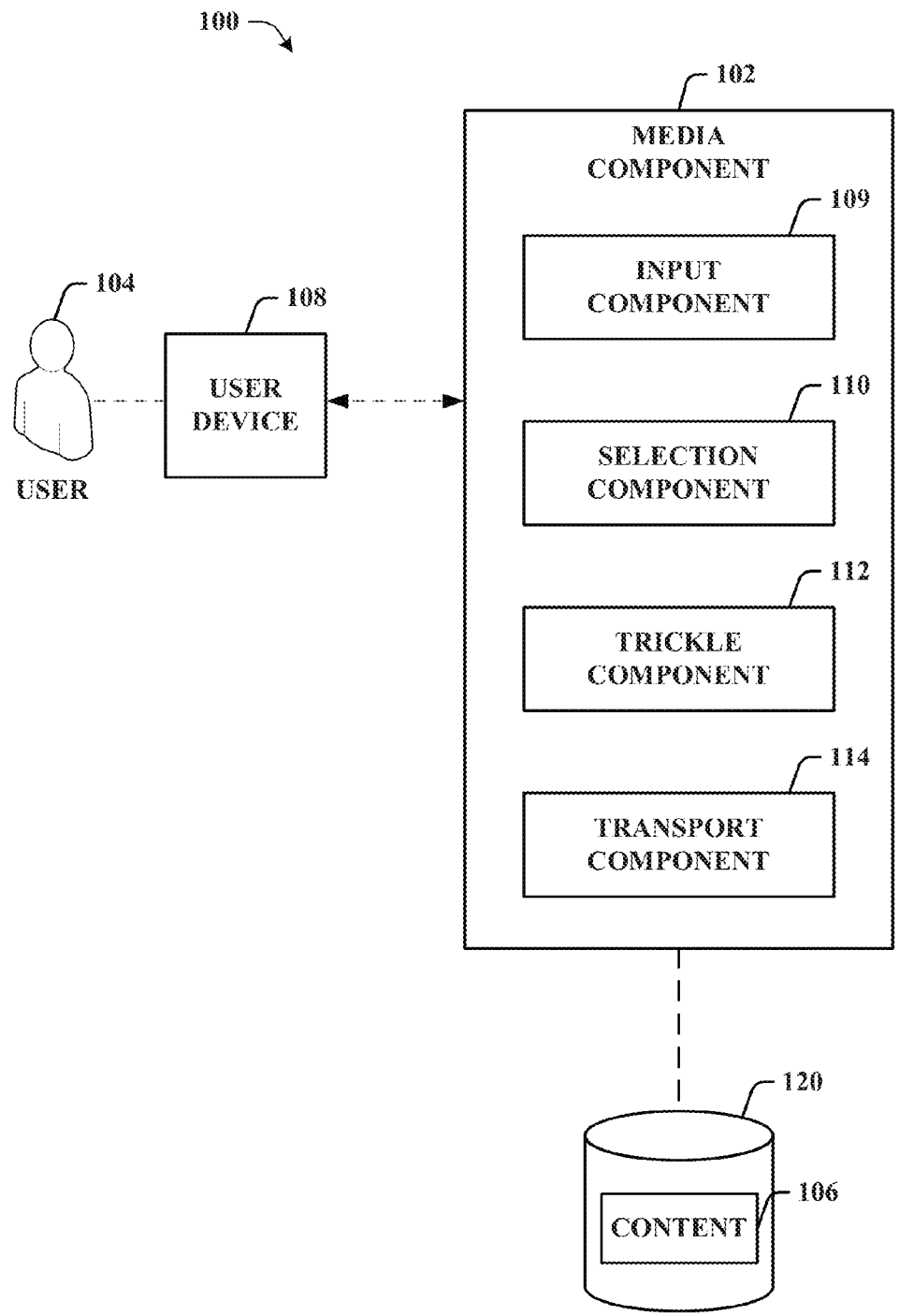
FIG. 1 illustrates an example system for dynamic media transmission rate control using congestion window size described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

It is to be appreciated that in accordance with one or more implementations described in this disclosure, users can opt-in or opt-out of providing personal information, demographic information, location information, proprietary information, sensitive information, or the like in connection with data gathering aspects. Moreover, one or more implementations described herein can provide for anonymizing collected, received, or transmitted data.

One non-limiting implementation of this disclosure provides for accurate and efficient dynamic media transmission rate control using congestion window size. More particularly, in accordance with an embodiment, a media component streams content to a user device based at least in part on a congestion window size, and a trickle component determines the congestion window size based at least in part on a set of limiting criteria.

Non-Limiting Examples of Systems for Dynamic Media Transmission Rate Control Using Congestion Window Size Turning now to FIG. 1, illustrated is an example system 100 for dynamic media transmission rate control using congestion window size in accordance with various aspects described in this disclosure. Generally, system 100 can include a memory that stores computer executable components and a processor that executes computer executable components stored in the memory, examples of which can be found with reference to FIG. 12. System 100 includes a media component 102. The media component 102 sends, provides, or otherwise streams media content (content) to a user 104. For example, in one implementation, in response to a request received from the user 104, the media component 102 provides content included in a set of content 106 to a user device 108 associated with the user 104 via a network connection. The content can include but is not limited to videos, music, applications, and/or video games. The user device 108 (e.g., client, client device, etc.) can include but is not limited to a smart phone, a cell phone, a personal digital assistant (PDA), a tablet, a laptop, a desktop, a portable music player, a video game system, an electronic reader (e-reader), a global positioning system (GPS), a set-top box, a digital video recorder (DVR), a digital media receiver, and/or a television (e.g., an internet enabled television). The media component 102 includes an input component 109, a selection component 110, a transport control protocol (TCP) trickle component 112 (trickle component 112), and a transport component 114.

The input component 109 acquires, obtains, or otherwise receives input from the user 104 related to initiating and/or controlling content streaming. For example, in one embodiment, the input component 109 generates, manages, or otherwise controls a user interface, and/or application programming interface (API) to facilitate receiving input from the user 104. For instance, the input component 109 can receive a request (e.g., input) from the user 104, via the user device 108, to stream content included in the set of content 106. The input can include explicit user inputs (e.g., configuration selections, question/answer, etc.) such as from mouse selections, keyboard selections, and/or speech. Additionally or alternatively, the input can include data uploads, wherein a data upload is a transfer of data from the user or a third party source (e.g. computer or a computer readable medium), to the input component 109. For instance, an application (e.g., a media player, etc.) executing on the user device 108 can provide input to the input component 109 related to initiating streaming of content.

The selection component 110 identifies, locates, or otherwise determines a set of data associated with requested content (content data) to stream to the user device 108 based on a set of user criteria. The user criteria can include but is not limited to a set of privileges associated with the user 104, a type of the user device 108, and/or a set of restrictions associated with the content (e.g., copy protection, digital rights management, etc.). For instance, the user 104 can request streaming of a first video (e.g., using the input component 109) included in the set of content 106. The selection component 110 can determine that the user device 108 is a smart phone, and select a version of the first video adapted for display on a smart phone included in the set of content 106. As an additional or alternative example, the selection component 110 can provide a version of the first video corresponding to a digital rights management (DRM) solution employed on the user device 108.

The trickle component 112 limits, regulates, or otherwise controls a rate of streaming for the content in part by determining, bounding, or otherwise setting a transmission control protocol (TCP) congestion window size. For example, in one implementation, the trickle component 112 determines or sets a value of a maximum congestion window size (e.g., cwnd_clamp) based on a set of limiting criteria. The limiting criteria can include but are not limited to queuing delay or round-trip time (RTT), a target transmission rate (R), and/or a packet loss compensation factor (compensation factor) (discussed in greater detail with reference to FIGS. 2 and 3). Typically, a TCP congestion control stack continually increases a quantity (W) of packets in transmit for a congestion window until losses occur or the value of W is about or equal to the maximum congestion window size (e.g., cwnd_clamp). The trickle component 112 sets the value of W based on the limiting criteria to control, manage, or otherwise limit a burst size that a TCP flow sends at respective RTTs (discussed in greater detail with reference to FIGS. 2 and 3).

The transport component 114 transmits, sends, or otherwise streams content data (e.g., selected by the selection component 110) at a rate less than or equal to the value of W. For instance, if W is set to 10 packets per second (e.g., using the trickle component 112), then the transport component 114 streams content data at a rate less than or equal to 10 packets per second. It is to be appreciated that although the trickle component 112 and transport component 114 are illustrated as being separate components, and are illustrated as being included in the media component 102, such implementation is not so limited. For example, the trickle component 112 can and transport component 114 can be integrated. As an additional or alternative example, the trickle component 112 and/or transport component 114 can be stand-alone components. Furthermore, it is to be appreciated that although the set of content 106 is illustrated as being maintained in a data store 120, such implementation is not so limited. For example, the set of content 106 can be maintained in a different location, and the media component 102 can access the set of content 106, for example, using a network connection.

Figure 2:
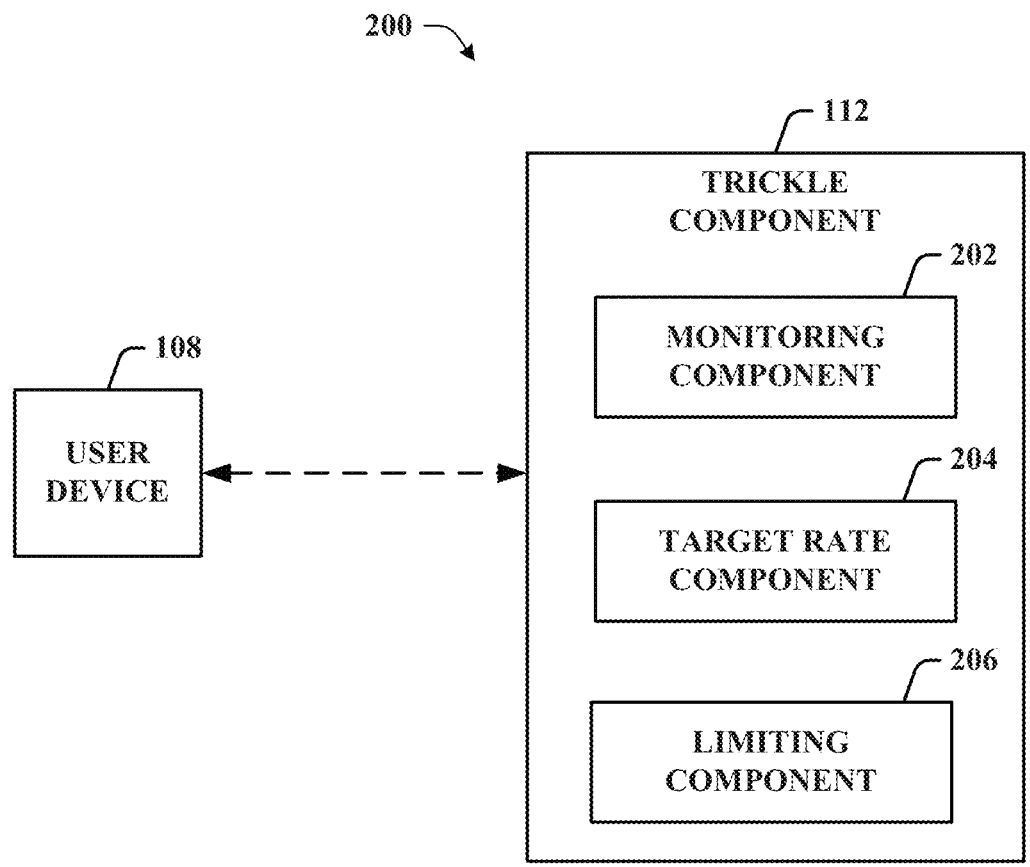
FIG. 2 illustrates an example trickle component in accordance with various aspects described in this disclosure.

FIG. 2 illustrates a non-limiting implementation of a system 200 with an example trickle component 112 in accordance with various aspects described in this disclosure. As discussed, the trickle component 112 limits, regulates, or otherwise controls a rate of content streaming in part by determining, bounding, or otherwise setting a transmission control protocol (TCP) congestion window size. For example, in one implementation, the trickle component 112 determines or sets a value of a maximum congestion window size (e.g., cwnd_clamp) based on a set of limiting criteria. The trickle component 112 in FIG. 2 includes a monitoring component 202, a target rate component 204, and a limiting component 206.

The monitoring component 202 samples, observes, or otherwise monitors a queuing delay (RTT) for transmissions of data packets (packets) from a media server (e.g., media component 102) to a user device (e.g., user device 108). For example, in one embodiment, the monitoring component 202 continuously monitors the RTT for transmissions from the media component 102 to the user device 108. As an additional or alternative example, in one embodiment, the monitoring component 202 determines the RTT at predetermined intervals and/or predetermined times. For instance, at a first time, the monitoring component 202 can determine that the RTT is 200 milliseconds (ms), and a second time occurring a predetermined amount of time after the first time, the monitoring component 202 can determine that the RTT is 205 ms.

The target rate component 204 sets, generates, or otherwise determines a target transmission rate (R) based on a set of targeting criteria. The set of targeting criteria can include but is not limited to an encoding rate of the user device 108, and/or a maximum transmission rate set-point (max-rate set-point). For example, in one embodiment, the target rate component 204 determines an encoding rate for the user device 108 as X packets per second, where X is a real number greater than zero. The target rate component 204 determines the value of R based at least in part on X (discussed in greater detail with reference to FIG. 3). As an additional or alternative example, in one embodiment, a system administrator (e.g., supervisor, etc.) determines or sets a value of a max-rate set-point (Y), where Y is a real number greater than zero. The target rate component 204 sets or determines the value of R based at least in part on Y (discussed in greater detail with reference to FIG. 3).

The limiting component 206 controls, bounds, or otherwise sets a transmission control protocol (TCP) congestion window size based at least in part on the values of RTT (e.g., determined using the monitoring component 202) and R (e.g., determined using the target rate component 204). For example, in one implementation, the limiting component 206 sets a value of the maximum congestion window size (W) (e.g., cwnd_clamp) based on the product of the RTT and R (e.g., W=RTT×R). For instance, where the target transmission rate (R) is 50 packets per second and the RTT is 200 ms, the limiting component 206 determines or sets W to 10 packets per second (e.g., 10=50×0.2).

Figure 3:
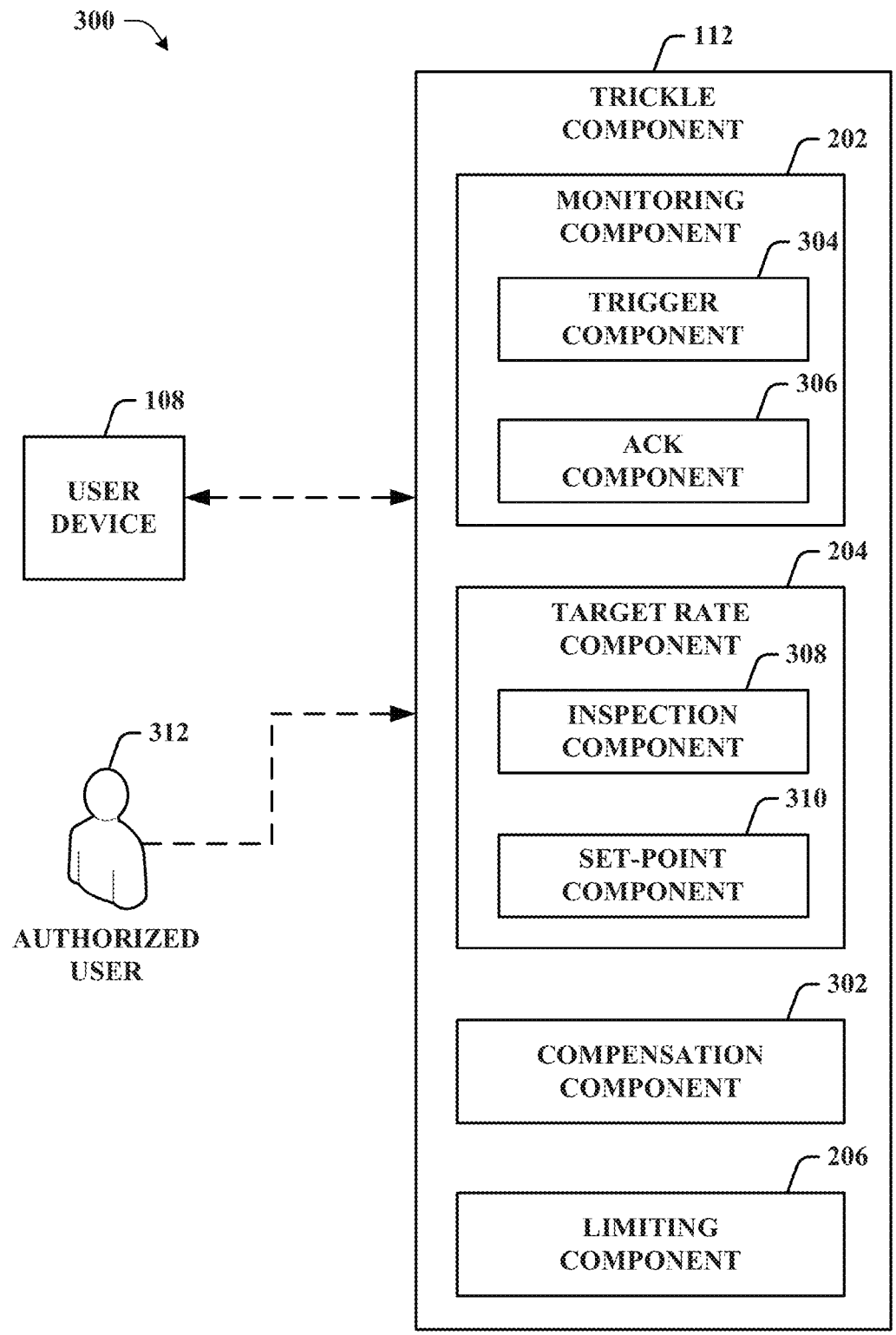
FIG. 3 illustrates an example trickle component in accordance with various aspects described in this disclosure.

Referring to FIG. 3, illustrated is a non-limiting implementation of a system 300 with an example trickle component 112 in accordance with various aspects described in this disclosure. As discussed, the trickle component 112 limits, regulates, or otherwise controls a rate of content streaming in part by determining, bounding, or otherwise setting a transmission control protocol (TCP) congestion window size. For example, in one implementation, the trickle component 112 determines or sets a value of a maximum congestion window size (e.g., cwnd_clamp) based on a set of limiting criteria. The trickle component 112 in FIG. 3 includes a monitoring component 202, a target rate component 204, a compensation component 302, and a limiting component 206.

As discussed, the monitoring component 202 samples, observes, or otherwise monitors a queuing delay (RTT) for transmissions of data or packets from the media component 102 to a user device 108. The monitoring component 202 in FIG. 3 includes a trigger component 304 and an acknowledgement component 306 (ACK component 306). The trigger component 304 initiates, starts, or otherwise triggers a timer when a data packet is sent (e.g., using the transport component 114) to a user device 108. The ACK component 306 ends, stops, or otherwise terminates the timer when an acknowledgement message (ACK) corresponding to the data packet is received from the user device 108. The monitoring component 202 determines the RTT as a function of time elapsed between the sending of the data packet and receipt of the ACK corresponding to the data packet.

As discussed, the target rate component 204 sets, generates, or otherwise determines a target transmission rate (R) based on a set of targeting criteria. The set of targeting criteria can include but is not limited to an encoding rate of the user device 108, and/or a maximum rate set-point. The target rate component 204 in FIG. 3 includes an inspection component 308, and a set-point component 310. The inspection component 308 determines a multimedia bit encoding rate (encoding rate) of the user device 108. For example, in one embodiment, the inspection component 308 analyzes, examines, or otherwise inspects the user device 108 and/or applications executing on the user device 108, and based on the inspection, determines the encoding rate. As an additional or alternative example, in one embodiment, the inspection component 308 acquires, obtains, or otherwise receives an encoding rate indicator from the user device 108 and/or applications executing on the user device 108. For instance, the inspection component 308 can receive a message from the user device 108 that includes an encoding rate for the user device 108. The target rate component 204 determines a value of R based at least in part on the encoding rate of the user device 108. For example, in one embodiment, the target rate component 204 determines the value of R as Z percent of the encoding rate of the user device 108, where Z is real number between 0 and 100. For instance, the target rate component 204 can determines the value of R is equal to 90% or the encoding rate (e.g., R=0.9*encoding rate). However, it is to be appreciated that the value of R can be larger than the encoding rate. For example, R can be equal to 1.3*encoding rate (e.g., Z is equal to 130). As such, Z can be a real number greater than 100.

The set-point component 310 acquires, obtains, or otherwise receives a value of a maximum transmission rate set-point (max-rate set-point) from an authorized user 312. The authorized user 312 can include but is not limited to a system administrator, a system engineer, and/or an authorized operator. For example, in one embodiment, the authorized user 312 provides input including, detailing, or otherwise indicating the max rate set-point to the set-point component 310. The input can include explicit user inputs (e.g., configuration selections, question/answer, etc.) such as from mouse selections, keyboard selections, and/or speech. Additionally or alternatively, the input can include data uploads, wherein a data upload is a transfer of data from the user or a third party source (e.g. computer or a computer readable medium), to the set-point component 310. The target rate component 204 determines a value of R based at least in part on the max rate set-point. For example, in one embodiment, the target rate component 204 determines the value of R as Z percent of the max-rate set-point, where Z is real number between 0 and 100. For instance, the target rate component 204 can determines the value of R is equal to 85% or the max-rate set-point (e.g., R=0.85*max-rate set-point). However, it is to be appreciated that the value of R can be larger than the max-rate set-point. For example, R can be equal to 1.5*max-rate set-point (e.g., Z is equal to 150). As such, Z can be a real number greater than 100.

The compensation component 302 offsets, corrects, or otherwise compensates for packet loss during content streaming. For example, in one embodiment, the compensation component 302 identifies, detects, or otherwise determines packet loss experienced during content streaming. The compensation component 302 compares an amount of the packet loss (e.g., bits, percentage, etc.) to a predetermined loss threshold, and, based on the comparison, generates or determines a packet loss compensation factor (compensation factor) for determining a congestion window size. For instance, if the amount of packet loss satisfies (e.g., meets or exceeds) the predetermined loss threshold, then the compensation component 302 can generate a compensation factor of C % (e.g., 25%), where C is a real number between 0 and 100. However, it is to be appreciated that C can be a real number larger than 100 (e.g., C % can be equal to 125%).

The limiting component 206 controls, limits, or otherwise bounds a transmission control protocol (TCP) congestion window size based at least in part on the values of RTT (e.g., determined using the monitoring component 202), R (e.g., determined using the target rate component 204) and the compensation factor (e.g., determined using the compensation component 302). For example, in one implementation, the limiting component 206 sets a value of the maximum congestion window size (W) (e.g., cwnd_clamp) based on the product of the compensation factor, RTT, and R (e.g., W=Compensation Factor*RTT*R). The maximum congestion window size (W) can be expressed as an integer value (e.g., a ceiling function or a floor function can be implemented to calculate W). In one example, where the target transmission rate (R) is 50 packets per second, the queuing delay (RTT) is 200 ms, and packet loss above the predetermined loss threshold is detected (e.g., a Compensation Factor equal to 0.75 is generated), the limiting component 206 can set W to 8 packets per second (e.g., 8=ceil(0.75*0.2*50)).

Figure 4:
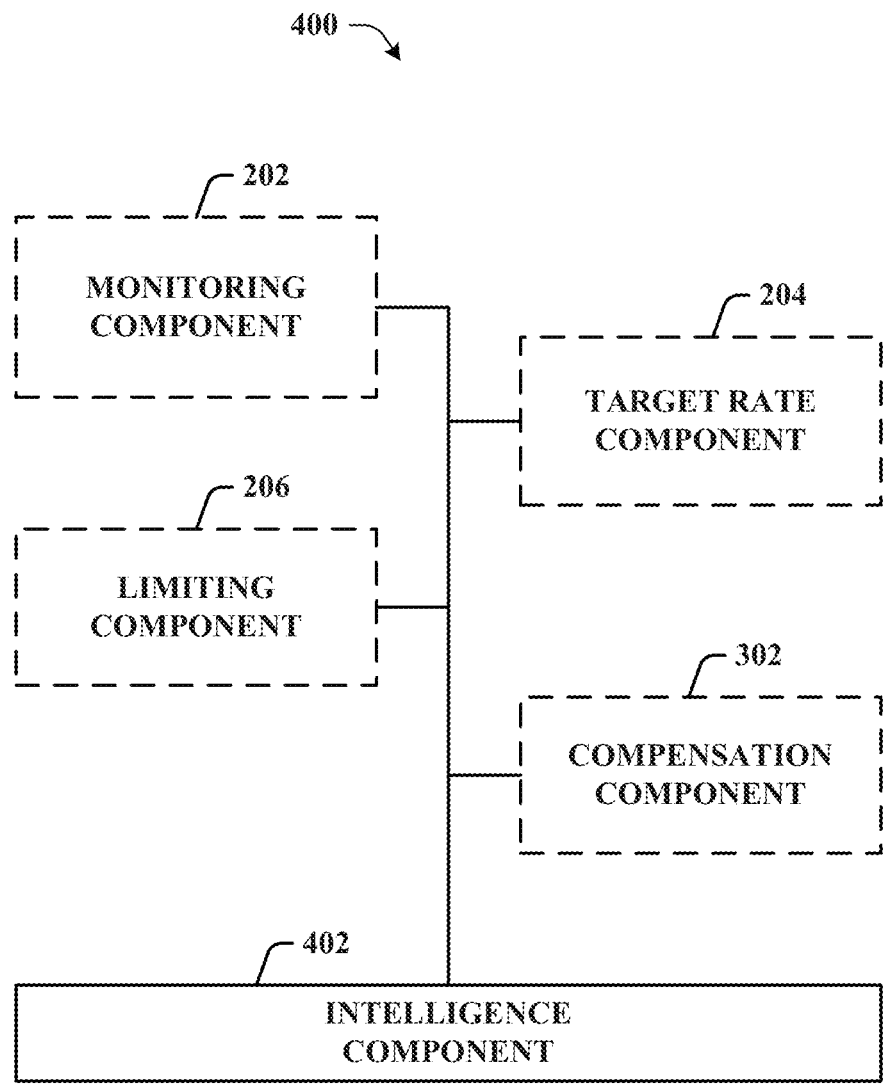
FIG. 4 illustrates an example system for dynamic media transmission rate control using congestion window size described in this disclosure.

FIG. 4 illustrates an example system 400 that employs an intelligence component 402 that facilitates dynamic media transmission rate control using congestion window size in accordance with various aspects described in this disclosure. For example, all or portions of monitoring component 202, target rate component 204, limiting component 206, and/or compensation component 302 are operatively coupled to intelligence component 402. Additionally or alternatively, all or portions of intelligence component 402 may be included in one or more components described in this disclosure. The intelligence component 402 can provide for or aid in various inferences or determinations. For example, in one embodiment, the intelligence component 402 facilitates inferring a packet loss compensation factor. As discussed, the compensation component 302 compares an amount of packet loss (e.g., bits, percentage, etc.) to a predetermined loss threshold, and, based on the comparison, generates or determines a compensation factor for setting a congestion window size. The intelligence component 402 can infer or determine the value of the compensation factor for bounding the congestion window size based at least in part on the amount of packet loss.

Figure 5:
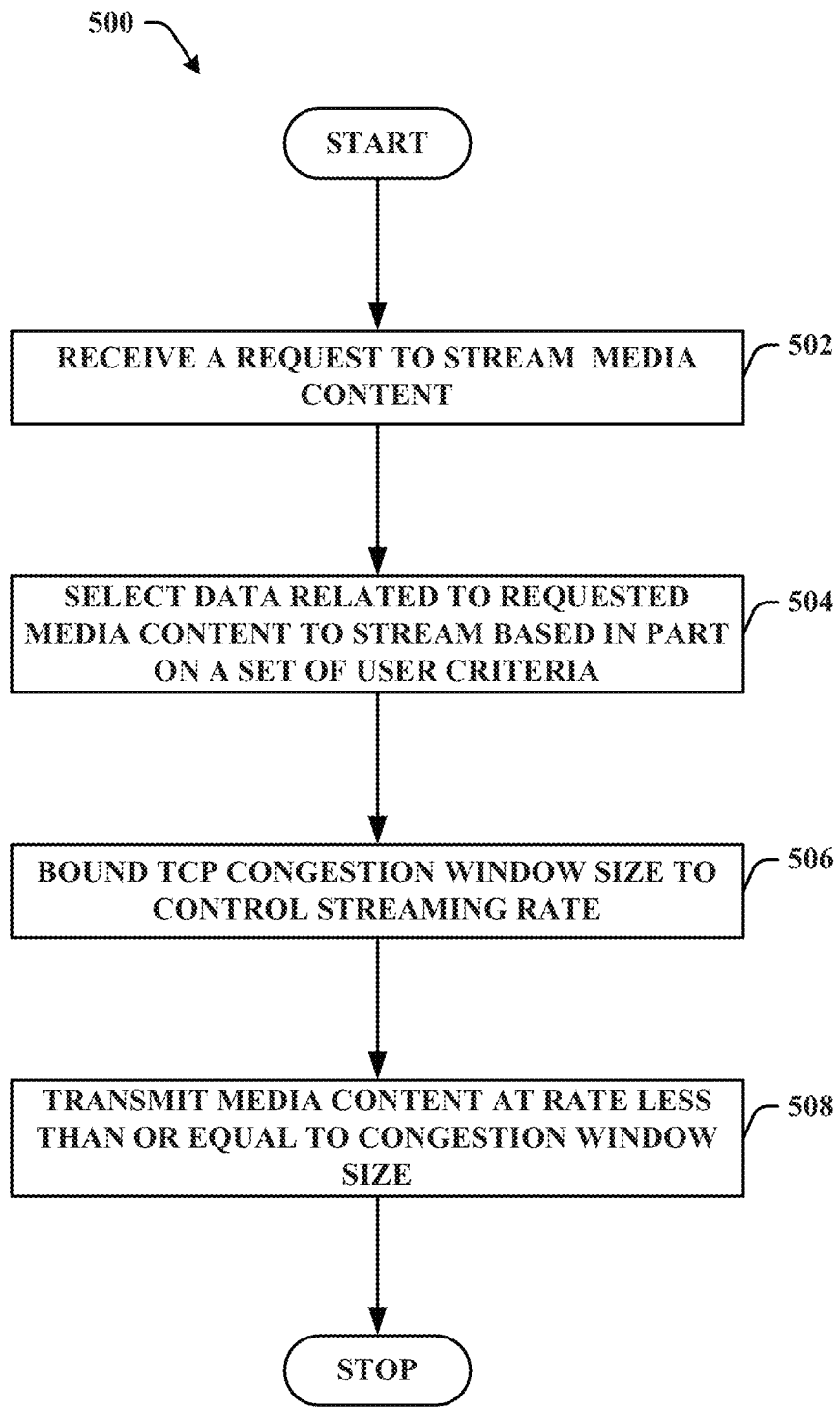
FIGS. 5-7 are example flow diagrams of respective methodologies for dynamic media transmission rate control using congestion window size in accordance with various aspects described herein.
Figure 6:
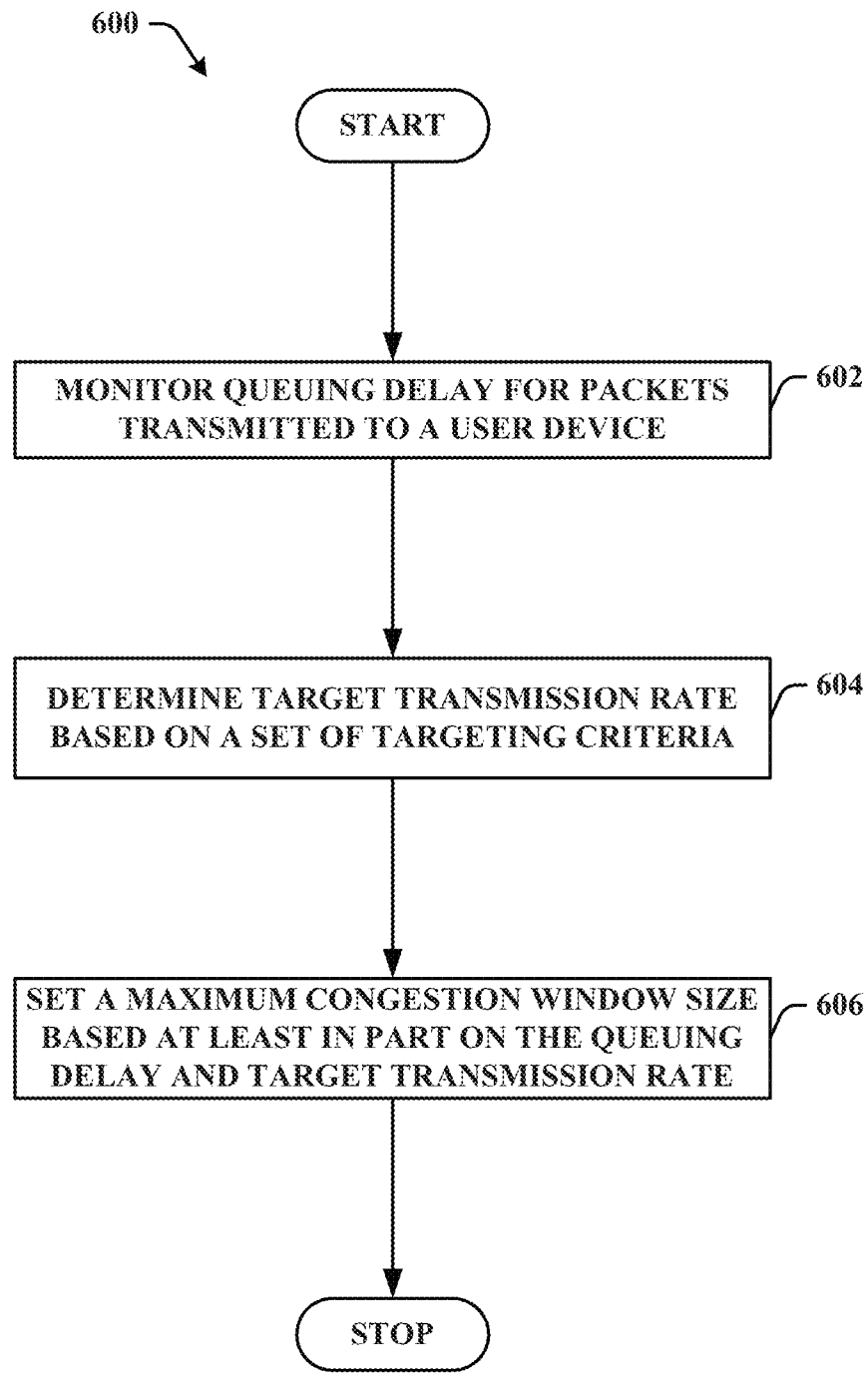
Figure 7:
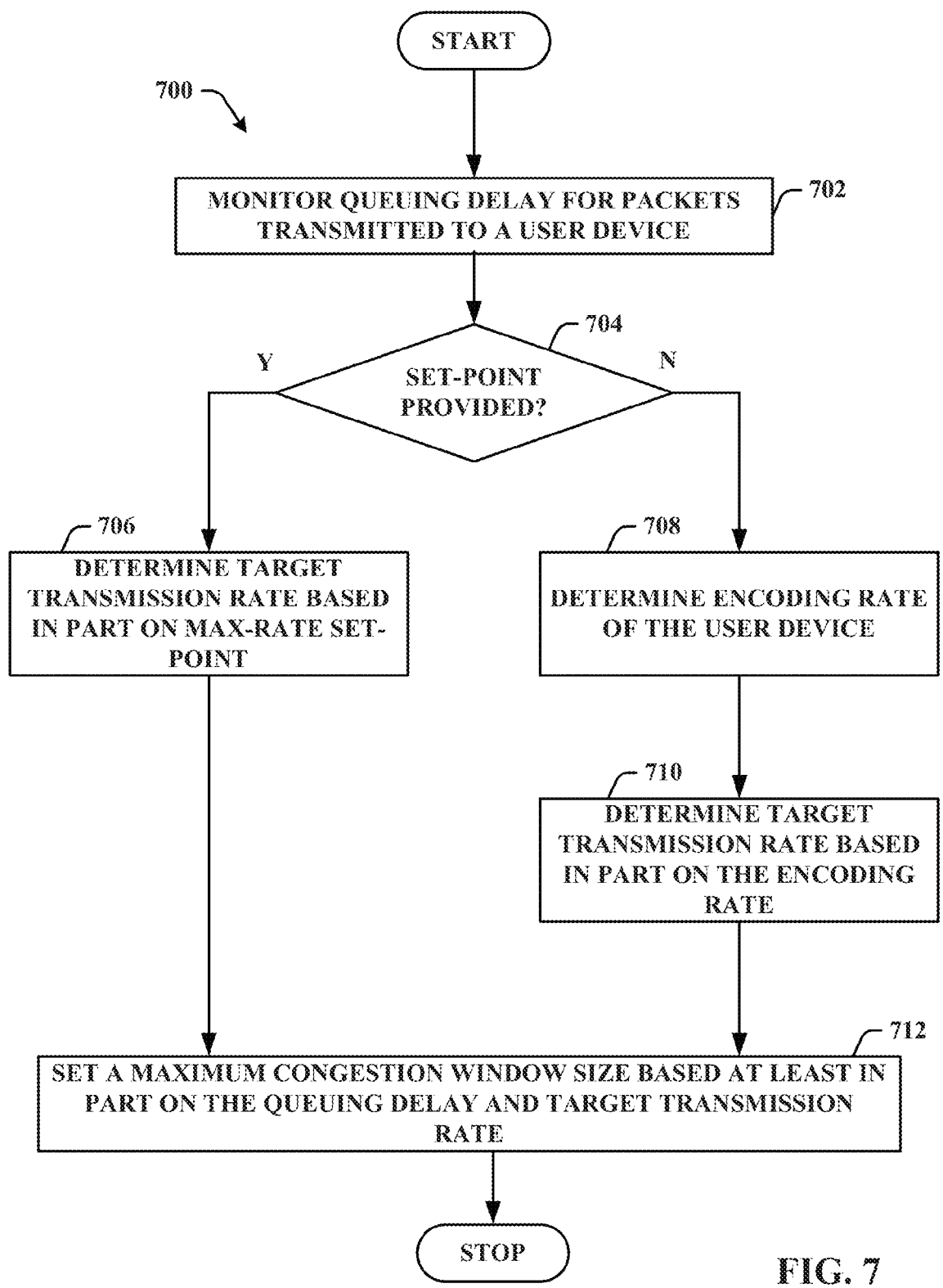

Non-Limiting Examples of Methods for Dynamic Media Transmission Rate Control Using Congestion Window Size FIGS. 5-7 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 5, illustrated is an example methodology 500 for dynamic media transmission rate control using congestion window size in accordance with various aspects described in this disclosure. At reference numeral 502, a request to stream media content is received (e.g., using the input component 109). The request can include explicit user inputs (e.g., configuration selections, question/answer, etc.) such as from mouse selections, keyboard selections, and/or speech. Additionally or alternatively, the request can include data uploads, wherein a data upload is a transfer of data from the user or a third party source (e.g. computer or a computer readable medium). For instance, an application (e.g., a media player, etc.) executing on a user device can provide the request.

At reference numeral 504, data related to the requested media content is selected for streaming based at least in part on a set of user criteria (e.g., using the selection component 110). The user criteria can include but is not limited to a set of privileges associated with a user, a type of user device, and/or a set of restrictions associated with the content (e.g., copy protection, digital rights management, etc.). For instance, the user can request streaming of a first video (e.g., using the input component 109) via a smart phone, and a version of the first video adapted for display on a smart phone can be selected.

At reference numeral 506, a transmission control protocol (TCP) congestion window size is bounded to control a rate of streaming (e.g., using the trickle component 112). For example, in one implementation, a value of a maximum congestion window size (e.g., cwnd_clamp) is determined based in part on a set of limiting criteria. The limiting criteria can include but are not limited to queuing delay or round-trip time (RTT), a target transmission rate (R), and/or a packet loss compensation factor (discussed in greater detail with reference to FIGS. 2 and 3). Typically, a TCP congestion control stack continually increases a quantity (W) of packets in transmit for a congestion window until losses occur or the value of W is about or equal to the maximum congestion window size (e.g., cwnd_clamp). Bounding the value of W based on the limiting criteria limits a burst size that a TCP flow sends at respective RTTs. At reference numeral 508, the content data is streamed at a rate less than or equal to the determined value of W (e.g., using the transport component 114). For instance, if W is set to 10 packets per second (e.g., using the trickle component 112), then the content data is streamed at a rate less than or equal to 10 packets per second.

FIG. 6 illustrates an example methodology 600 for dynamic media transmission rate control using congestion window size in accordance with various aspects described in this disclosure. At reference numeral 602, a queuing delay (RTT) for transmissions of packets to a user device (e.g., from the media component 102) is monitored (e.g., using the monitoring component 202). For example, in one embodiment, the RTT is continuously monitored for transmissions to the user device 108. As an additional or alternative example, the RTT is determined at predetermined intervals and/or predetermined times. For instance, at a first time, it can be determined that the RTT is 200 milliseconds (ms), and a second time, occurring a predetermined amount of time after the first time, it can be determined that the RTT is 205 ms.

At reference numeral 604, a target transmission rate (R) is determined based on a set of targeting criteria (e.g., using the target rate component 204). The set of targeting criteria can include but is not limited to an encoding rate of a user device, and/or a max rate set-point. For example, in one embodiment an encoding rate of a user device is determined as X packets per second, where X is a real number greater than zero. The value of R is determined based at least in part on X. As an additional or alternative example, in one embodiment, an authorized user determines or sets a value of a max rate set-point (Y), where Y is a real number greater than zero, and the value of R is determined based at least in part on Y.

At reference numeral 606, a transmission control protocol (TCP) congestion window size is set based at least in part on the values of RTT and R (e.g., using the limiting component 206). For example, in one implementation, the value of the maximum congestion window size (W) (e.g., cwnd_clamp) is based on the product of the RTT and R (e.g., W=RTT×R). For instance, where the target transmission rate (R) is 50 packets per second, and RTT is 200 ms, then W equals 10 packets per second (e.g., 10=50×0.2).

FIG. 7 illustrates an example methodology 700 for dynamic media transmission rate control using congestion window size in accordance with various aspects described in this disclosure. At reference numeral 702, a queuing delay (RTT) for transmissions of packets to a user device (e.g., from the media component 102) is monitored (e.g., using the monitoring component 202). For example, in one embodiment, the RTT is continuously monitored. As an additional or alternative example, the RTT is determined at predetermined intervals and/or predetermined times. For instance, at a first time, it can be determined that the RTT is 200 milliseconds (ms), and a second time, occurring a predetermined amount of time after the first time, it can be determined that the RTT is 205 ms.

At reference numeral 704, a determination is made whether a maximum transmission rate set-point (max-rate set-point) has been provided by an authorized user (e.g., using the set-point component 310). At reference numeral 706, if it is determined that a max-rate set-point has been provided by an authorized user (Y at 704), then a target transmission rate (R) is determined based in part on the max-rate set-point (e.g., using the target rate component 204). For example, in one embodiment, the value of R is determined as Z percent of the max-rate set-point, where Z is real number between 0 and 100. For instance, the value of R can be determined to be 85% of the max-rate set-point (e.g., R=0.85*max-rate set-point).

Returning to reference numeral 704, if it is determined that a max-rate set-point has not been provided (N at 704), then at reference numeral 708, a multimedia bit encoding rate (encoding rate) of the user device is determined (e.g., using the inspection component 308). For example, in one embodiment, the user device and/or applications executing on the user device are inspected, and based on the inspection, the encoding rate is determined (e.g., using the inspection component 308). As an additional or alternative example, in one embodiment, an encoding rate indicator is received from the user device and/or applications executing on the user device (e.g., using the inspection component 308).

At reference numeral 710, a value of R is determined based at least in part on the encoding rate of the user device (e.g., using the target rate component 204). For example, in one embodiment, the value of R is determined as a percentage, Z, of the encoding rate, where Z is a real number between 0 and 100. For instance, the target rate component 204 can determine the value of R is equal to 90% of the encoding rate (e.g., R=0.90*encoding rate). However, it is to be appreciated that Z can be a real number larger than 100 (e.g., media can be transferred faster than an encoding rate of the media)

At reference numeral 712, a transmission control protocol (TCP) congestion window size is set based at least in part on the values of RTT, R, and the compensation factor (e.g., using the limiting component 206). For example, in one implementation, a value of the maximum congestion window size (W) (e.g., cwnd_clamp) is set based on the product of the compensation factor, RTT and R (e.g., W=Compensation Factor*RTT*R). The maximum congestion window size (W) can be expressed as an integer value (e.g., a ceiling function or a floor function can be implemented to calculate W). In one example, where the target transmission rate (R) is 50 packets per second, the queuing delay (RTT) is 200 ms, and packet loss above the predetermined loss threshold is detected (e.g., a Compensation Factor equal to 1.25 is generated), the limiting component 206 can set W to 13 packets per second (e.g., 13=ceil(1.25*0.2*50)).

Figure 8:
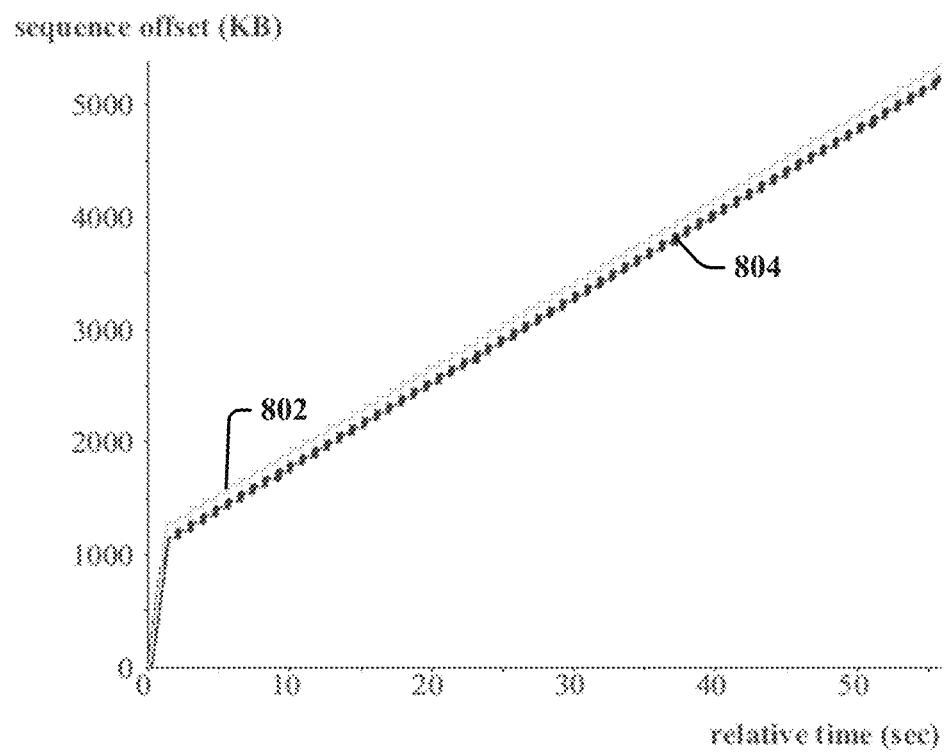
FIG. 8 is an example plot illustrating time versus sequence of bytes for typical streaming of media content.

Non-Limiting Examples of Experimental Results for Dynamic Media Transmission Rate Control Using Congestion Window Size FIG. 8 is an example plot illustrating time versus sequence of bytes for typical streaming of media content. The X-axis corresponds to time (e.g., seconds) and the Y-axis corresponds to bytes of media content (e.g., KB). The first three seconds of flow (e.g., corresponding to 30 seconds of the video playback) represents a bursting period 802. During the bursting period 802, a server sends the content as fast as possible. After the bursting period 802, the server initiates a throttling phase 804. For example, during the throttling phase 804, a token bucket rate calculation based on a target transmission rate (R) and application block size (e.g., 64 KB default) can be employed, and network writes can have a maximum size (e.g., one block size plus headers). Before sending each block, there is a sleep duration determined according to a quantity of token bucket bytes available. For example, the sleep duration for a 10 MB video having a target transmission rate of 600 Kbps is 800 ms for every 64 KB of data. Current transmission control protocol (TCP) provides for best-effort. In other words, data is sent as fast as possible, and adapts the rate to the actual network speed. The trickle component 112 adjusts or changes TCP to send at a rate determined by the server, and not as fast as the network speed (discussed in greater detail with reference to FIGS. 2 and 3).

Figure 9:
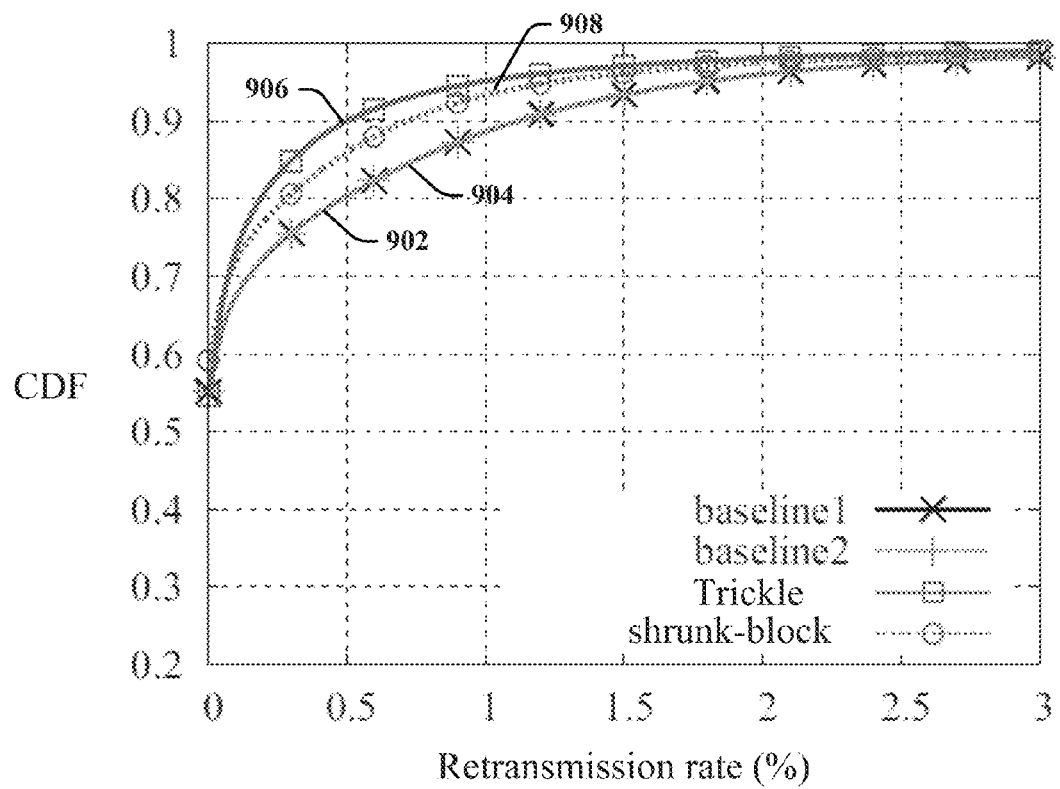
FIG. 9 is an example cumulative distribution function illustrating retransmission rates during a throttling phase in accordance with various aspects described in this disclosure.

FIG. 9 is an example cumulative distribution function (CDF) illustrating retransmission rates (e.g., during a throttling phase) in accordance with various aspects described in this disclosure. A first baseline 902 and a second baseline 904 are substantially matching. Controlling a rate of streaming for the content in part by setting a transmission control protocol (TCP) congestion window size (Trickle 906) (e.g., using the trickle component 112) lowers the retransmission rate consistently compared to the other illustrated techniques (e.g., 902, 904 and 908). For instance, 90% of connections experience retransmission rates lower that 0.5% using Trickle 906, while 85% have this behavior using a shrunk-block implementation 908 (e.g., where a block size of 64 KB is shrunk to 16 KB), and 80% using the baselines 902 and 904. On average, Trickle 906 reduces retransmission rates by 43% compared to the baselines 902 and 904, in part, because the congestion window is operating at a much lower value compared to the baselines 902 and 904 where the congestion window grows until losses occur.

Figure 10:
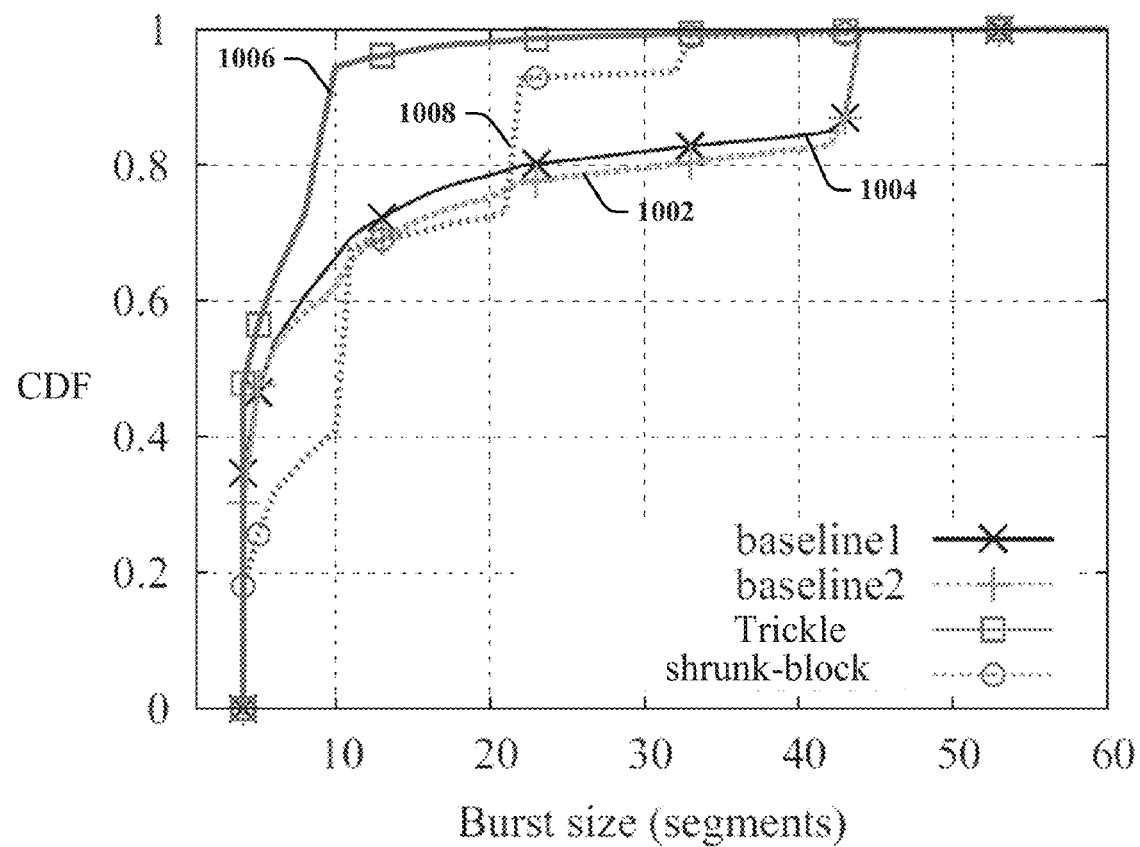
FIG. 10 is an example cumulative distribution function illustrating burst sizes in accordance with various aspects described in this disclosure.

FIG. 10 is an example cumulative distribution function (CDF) illustrating burst sizes in accordance with various aspects described in this disclosure. In a first baseline example 1002 and a second baseline 1004, 60% of burst sizes are less than 10 packets. In addition, for the baselines 1002 and 1004 there is a clear step for burst sizes of 44 packets (64 KB), wherein about 20% of burst sizes are equal to the application block size. Controlling a rate of streaming for the content in part by determining a transmission control protocol (TCP) congestion window size (Trickle 1006) (e.g., using the trickle component 112) results in 94% of bursts to be of size less than 10 packets. In comparison, about 40% of bursts have a size of less than 10 packets when a shrunk-block technique 1008 is employed. The large bursts in the baselines 1002 and 1004 can result in undesirable packet drops.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 11:
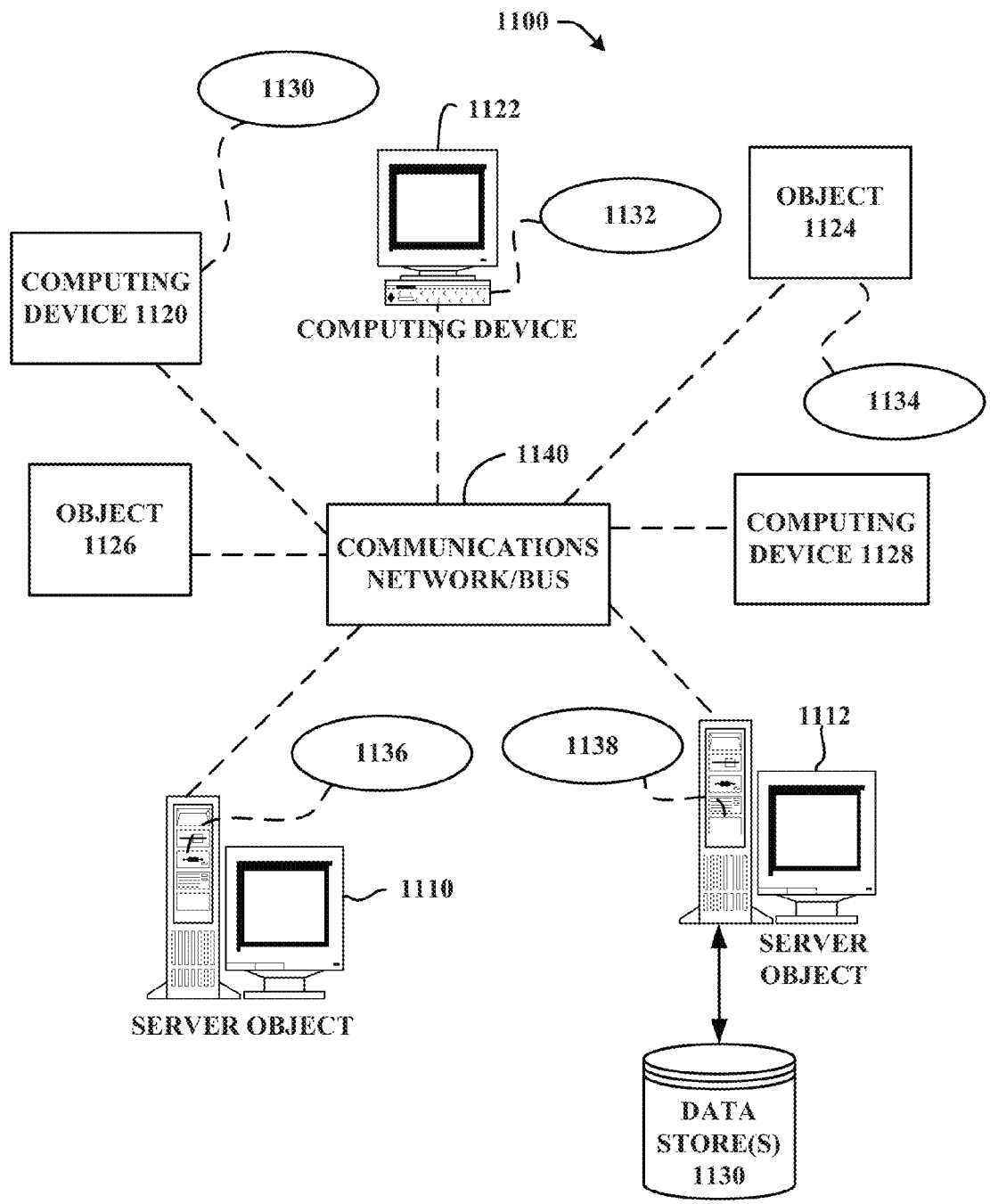
FIG. 11 is a block diagram representing an exemplary non-limiting networked environment in which the various embodiments can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be appreciated that computing objects 1110, 1112, etc. and computing objects or devices 1120, 1122, 1124, 1126, 1128, etc. may comprise different devices, such as personal data assistants (PDAs), audio/video devices, mobile phones, MP3 players, personal computers, tablets, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each computing object 1110, 1112, etc. or computing objects or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc. provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1140 is the Internet, for example, the computing objects 1110, 1112, etc. can be Web servers with which the client computing objects or devices 1120, 1122, 1124, 1126, 1128, etc. communicate via any of a number of known protocols, such as the hypertext transfer protocol (HTTP). Objects 1110, 1112, etc. may also serve as client computing objects or devices 1120, 1122, 1124, 1126, 1128, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 12 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 12:
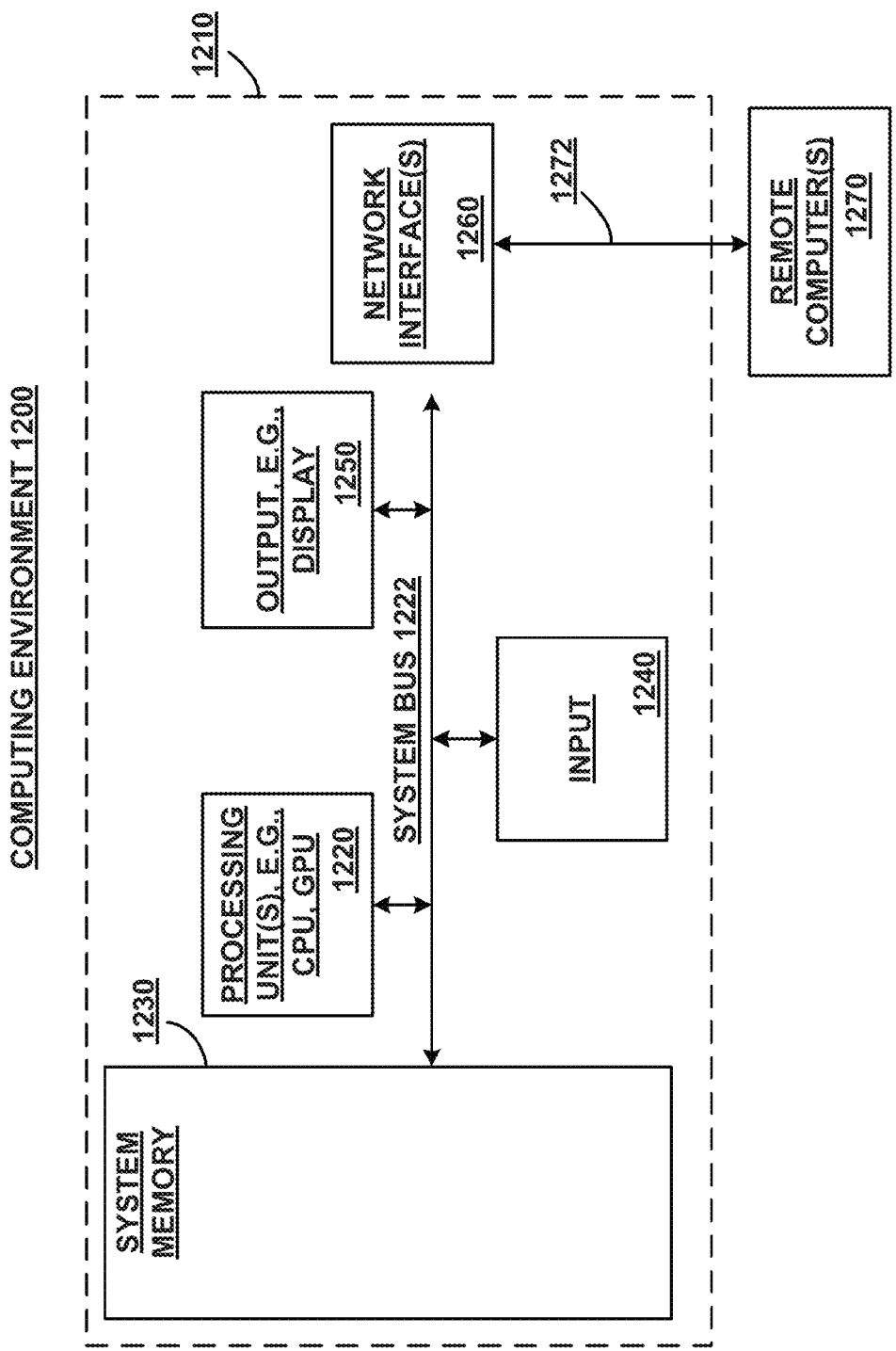
FIG. 12 is a block diagram representing an exemplary non-limiting computing system or operating environment in which the various embodiments may be implemented.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither is the computing environment 1200 be interpreted as having any dependency or requirement relating to any one or combination of components illustrated in the exemplary operating environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, memory 1230 may also include an operating system, application programs, other program modules, and program data.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media. Computer-readable storage media can be any available storage media that can be accessed by the computer, is typically of a non-transitory nature, and can include both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
a memory storing computer executable components; and
a processor configured to execute the following computer executable components stored in the memory:
 a media component that streams content to a user device based at least in part on a transmission control protocol maximum congestion window size; and
 a trickle component that determines the transmission control protocol maximum congestion window size based at least in part on a set of limiting criteria, wherein the set of limiting criteria includes a target transmission rate based on a product of a round-trip time (RTT) and an encoding rate of an application executing on the user device, wherein the encoding rate is based on an encoding rate indicator received from the user device.

2. The system of claim 1, wherein the set of limiting criteria includes a queuing delay.

3. The system of claim 1, wherein the set of limiting criteria includes a packet loss compensation factor.

4. A system, comprising:
a memory storing computer executable components; and
a processor configured to execute the following computer executable components stored in the memory:
 a monitoring component that monitors a queuing delay for transmissions of packets from a media server to a user device;
 an inspection component that determines an encoding rate of an application executing on the user device based on an encoding rate indicator received from the user device;
 a target rate component that determines a target transmission rate for the transmissions of the packets based at least in part on a set of targeting criteria, wherein the set of targeting criteria includes the encoding rate; and
 a limiting component that determines a transmission control protocol maximum congestion window size based on a product of the queuing delay and the target transmission rate.

5. The system of claim 4, wherein the set of targeting criteria includes a maximum transmission rate set-point.

6. The system of claim 4, further comprising a compensation component that determines an amount of packet loss satisfying a loss threshold, and in response to the amount of packet loss satisfying the loss threshold, determines a compensation factor based at least in part on the amount of packet loss.

7. The system of claim 6, wherein the limiting component determines the transmission control protocol maximum congestion window size based at least in part on the compensation factor.

8. The system of claim 4, further comprising a trigger component that initiates a timer when a data packet is sent.

9. The system of claim 8, further comprising an ACK component that stops the timer when an acknowledgement corresponding to the data packet is received.

10. The system of claim 9, wherein the monitoring component determines the queuing delay based at least in part on the timer.

11. A method, comprising:
employing a processor to execute computer executable components stored in memory to perform the following acts:
 monitoring a queuing delay for transmissions of packets from a media component to a user device;
 determining an encoding rate of an application executing on the user device based on an encoding rate indicator received from the user device;
 determining a target transmission rate based at least in part on a set of targeting criteria, wherein the set of targeting criteria includes the encoding rate;
 determining an amount of packet loss satisfying a loss threshold, and in response to the amount of packet loss satisfying the loss threshold, determining a compensation factor based at least in part on the amount of packet loss; and
 setting a size of a transmission control protocol maximum congestion window based on a product of the queuing delay, the target transmission rate, and the compensation factor.

12. The method of claim 11, further comprising streaming content based at least in part on the size of the transmission control protocol maximum congestion window.

13. The method of claim 11, wherein determining the target transmission rate based at least in part on the set of targeting criteria, includes determining the target transmission rate based at least in part on a maximum transmission rate set-point.

14. A method, comprising:
employing a processor to execute computer executable components stored in memory to perform the following acts:
 streaming content to a user device based on a transmission control protocol congestion window size;
 monitoring a queuing delay for packets of the streamed content;
 determining that a maximum transmission rate set-point has not been defined for the streamed content;
 determining, in response to determining the maximum transmission rate set-point has not been defined, an encoding rate of an application executing on the user device, wherein the encoding rate is based on an encoding rate indicator received from the user device;

determining a target transmission rate of the streamed content based at least in part on a set of targeting criteria, wherein the set of targeting criteria includes the determined encoding rate;

determining a compensation factor based at least in part on the amount of packet loss of the streamed content satisfying a loss threshold; and setting the transmission control protocol congestion window size based on a product of the queuing delay, the target transmission rate, and the compensation factor.

* * * * *